(12) United States Patent
Broekhuis et al.

(10) Patent No.: US 9,128,307 B2
(45) Date of Patent: Sep. 8, 2015

(54) ENHANCED THERMOCHROMIC WINDOW WHICH INCORPORATES A FILM WITH MULTIPLE LAYERS OF ALTERNATING REFRACTIVE INDEX

(71) Applicants: Michael D. Broekhuis, Wyoming, MI (US); Harlan J. Byker, West Olive, MI (US); Frederick A. Millett, Grand Haven, MI (US)

(72) Inventors: Michael D. Broekhuis, Wyoming, MI (US); Harlan J. Byker, West Olive, MI (US); Frederick A. Millett, Grand Haven, MI (US)

(73) Assignee: PLEOTINT, L.L.C., West Olive, MI (US)

( * ) Notice: Subject to any disclaimer, the term of this patent is extended or adjusted under 35 U.S.C. 154(b) by 0 days.

(21) Appl. No.: 13/771,285

(22) Filed: Feb. 20, 2013

(65) Prior Publication Data
US 2013/0229702 A1    Sep. 5, 2013

Related U.S. Application Data

(60) Provisional application No. 61/600,767, filed on Feb. 20, 2012.

(51) Int. Cl.
*G02F 1/01* (2006.01)
*G02B 26/08* (2006.01)
*G02F 1/29* (2006.01)
(Continued)

(52) U.S. Cl.
CPC ........ *G02F 1/0063* (2013.01); *B32B 17/10036* (2013.01); *B32B 17/10477* (2013.01); *B32B 17/10651* (2013.01); *B32B 17/10761* (2013.01); *G02F 1/0147* (2013.01)

(58) Field of Classification Search
USPC ........... 359/288, 290–292, 301, 201.1–203.1, 359/207.11, 209.1, 210.1, 212.1, 275–277
See application file for complete search history.

(56) References Cited

U.S. PATENT DOCUMENTS

| | | |
|---|---|---|
| 2,710,274 A | 6/1955 | Kuehl |
| 3,192,101 A | 6/1965 | Koenig |
| 3,236,651 A | 2/1966 | Marks et al. |

(Continued)

FOREIGN PATENT DOCUMENTS

| | | |
|---|---|---|
| EP | 0356116 | 2/1990 |
| JP | H02-180973 | 7/1990 |

(Continued)

OTHER PUBLICATIONS

Arutjunjan, R. et al., "Smart Thermochromic Glazing for Energy Saving Window Applications," Poster Session Abstract 8, The Fourth International Conference on Advanced Optical Materials and Devices, Tartu, Estonia (Jul. 6-9, 2004).

(Continued)

*Primary Examiner* — Stephone B Allen
*Assistant Examiner* — Brandi Thomas
(74) *Attorney, Agent, or Firm* — Thompson Hine LLP (57) ABSTRACT

A window comprising at least one thermochromic layer and a film comprising multiple layers of polymer with alternating refractive index (MLARI). The thermochromic layer has a reversible change in absorbance of electromagnetic radiation such that the absorbance increases as the temperature of the thermochromic layer increases and the absorbance decreases as the temperature of the thermochromic layer decreases. Particularly useful thermochromic materials are ligand exchange thermochromic materials. In various embodiments, the window may have multiple panes and may incorporate a low-e layer.

22 Claims, 5 Drawing Sheets

(51) Int. Cl.
*G02F 1/00* (2006.01)
*B32B 17/10* (2006.01)

(56) References Cited

U.S. PATENT DOCUMENTS

| | | |
|---|---|---|
| 3,445,291 A | 5/1969 | Stein |
| 3,610,724 A | 10/1971 | Frizzell |
| 3,723,349 A | 3/1973 | Heseltine et al. |
| 3,759,647 A | 9/1973 | Schrenk et al. |
| 3,773,882 A | 11/1973 | Schrenk |
| 3,816,335 A | 6/1974 | Evans |
| 3,884,606 A | 5/1975 | Schrenk |
| 4,044,519 A | 8/1977 | Morin et al. |
| 4,162,343 A | 7/1979 | Wilcox et al. |
| 4,310,584 A | 1/1982 | Cooper et al. |
| 4,446,305 A | 5/1984 | Rogers et al. |
| 4,540,623 A | 9/1985 | Im et al. |
| 4,575,259 A | 3/1986 | Bacci et al. |
| 4,577,619 A | 3/1986 | Howe, Jr. et al. |
| 4,970,315 A | 11/1990 | Schmidhalter |
| 5,094,055 A | 3/1992 | Berdan |
| 5,103,337 A | 4/1992 | Schrenk et al. |
| 5,126,880 A | 6/1992 | Wheatley et al. |
| 5,159,057 A | 10/1992 | Perry |
| 5,240,897 A | 8/1993 | Braun et al. |
| 5,244,602 A | 9/1993 | Van Gemert |
| 5,269,995 A | 12/1993 | Ramanathan et al. |
| 5,278,694 A | 1/1994 | Wheatley et al. |
| 5,330,686 A | 7/1994 | Smith et al. |
| 5,340,857 A | 8/1994 | Van Gemert |
| 5,360,659 A | 11/1994 | Arends et al. |
| 5,389,324 A | 2/1995 | Lewis et al. |
| 5,395,567 A | 3/1995 | Van Gemert et al. |
| 5,448,404 A | 9/1995 | Schrenk et al. |
| 5,451,344 A | 9/1995 | Knowles et al. |
| 5,458,814 A | 10/1995 | Kumar et al. |
| 5,466,398 A | 11/1995 | Van Gemert et al. |
| 5,525,430 A | 6/1996 | Chahroudi |
| 5,540,978 A * | 7/1996 | Schrenk .................. 428/212 |
| 5,547,815 A | 8/1996 | Vanmaele |
| 5,552,090 A | 9/1996 | Van Gemert et al. |
| 5,552,927 A | 9/1996 | Wheatly et al. |
| 5,565,147 A | 10/1996 | Knowles et al. |
| 5,578,252 A | 11/1996 | Van Gemert et al. |
| 5,637,262 A | 6/1997 | Van Gemert et al. |
| 5,645,767 A | 7/1997 | Van Gemert |
| 5,650,098 A | 7/1997 | Kumar et al. |
| 5,651,923 A | 7/1997 | Kumar et al. |
| 5,658,500 A | 8/1997 | Kumar et al. |
| 5,658,501 A | 8/1997 | Kumar et al. |
| 5,674,432 A | 10/1997 | Knowles et al. |
| 5,744,056 A | 4/1998 | Venkateshwaran et al. |
| 5,753,146 A | 5/1998 | Van Gemert et al. |
| 5,869,658 A | 2/1999 | Lin et al. |
| 5,882,774 A | 3/1999 | Jonza et al. |
| 5,976,424 A | 11/1999 | Weber et al. |
| 6,045,894 A | 4/2000 | Jonza et al. |
| 6,084,702 A | 7/2000 | Byker et al. |
| 6,088,163 A | 7/2000 | Gilbert et al. |
| 6,094,290 A | 7/2000 | Crawford et al. |
| 6,103,459 A | 8/2000 | Diel |
| 6,106,744 A | 8/2000 | Van Gemert et al. |
| 6,153,422 A | 11/2000 | Kashiba |
| 6,348,604 B1 | 2/2002 | Nelson et al. |
| 6,352,761 B1 | 3/2002 | Hebrink et al. |
| 6,362,303 B1 | 3/2002 | Byker et al. |
| 6,368,699 B1 | 4/2002 | Gilbert et al. |
| 6,373,618 B1 | 4/2002 | Agrawal et al. |
| 6,391,406 B1 | 5/2002 | Zenner et al. |
| 6,446,402 B1 | 9/2002 | Byker et al. |
| 6,459,514 B2 | 10/2002 | Gilbert et al. |
| 6,479,293 B1 | 11/2002 | Tamura et al. |
| 6,531,230 B1 | 3/2003 | Weber et al. |
| 6,565,982 B1 | 5/2003 | Ouderkirk et al. |
| 6,594,067 B2 | 7/2003 | Poll et al. |
| 6,620,872 B2 | 9/2003 | Fisher |
| 6,630,597 B1 | 10/2003 | Lin et al. |
| 6,665,107 B2 | 12/2003 | Forgette et al. |
| 6,737,159 B2 | 5/2004 | Garrett et al. |
| 6,737,418 B2 | 5/2004 | Hogenkamp et al. |
| 6,788,463 B2 | 9/2004 | Merrill et al. |
| 6,827,886 B2 | 12/2004 | Neavin et al. |
| 6,830,713 B2 | 12/2004 | Hebrink et al. |
| 6,924,014 B2 | 8/2005 | Ouderkirk et al. |
| 6,998,072 B2 | 2/2006 | Welch et al. |
| 6,999,233 B2 | 2/2006 | Allen et al. |
| 7,057,816 B1 | 6/2006 | Allen et al. |
| 7,094,368 B2 | 8/2006 | Kim et al. |
| 7,138,173 B2 | 11/2006 | Wheatley et al. |
| 7,147,903 B2 | 12/2006 | Ouderkirk et al. |
| 7,179,535 B2 | 2/2007 | Fisher |
| 7,226,966 B2 | 6/2007 | Kambe et al. |
| 7,255,914 B2 | 8/2007 | Shirk et al. |
| 7,256,296 B2 | 8/2007 | Diamond et al. |
| 7,297,393 B2 | 11/2007 | Jonza et al. |
| 7,320,826 B2 | 1/2008 | Kumar et al. |
| 7,525,717 B2 | 4/2009 | Byker et al. |
| 7,538,931 B2 | 5/2009 | Byker et al. |
| 7,542,196 B2 | 6/2009 | Byker et al. |
| 7,556,750 B2 | 7/2009 | Xiao et al. |
| 7,556,751 B2 | 7/2009 | Chopra et al. |
| 7,560,056 B2 | 7/2009 | Van Gemert et al. |
| 7,584,630 B2 | 9/2009 | Van Gemert |
| 7,727,633 B2 | 6/2010 | Kirkman et al. |
| 7,817,328 B2 | 10/2010 | Millett et al. |
| 7,851,054 B2 | 12/2010 | Weber et al. |
| 7,911,676 B2 | 3/2011 | Knowles et al. |
| 7,952,805 B2 | 5/2011 | McGurran et al. |
| 7,985,456 B2 | 7/2011 | Stewart et al. |
| 8,003,751 B2 | 8/2011 | Share et al. |
| 8,018,639 B2 | 9/2011 | Byker et al. |
| 8,154,788 B2 | 4/2012 | Millett et al. |
| 8,182,718 B2 | 5/2012 | Byker et al. |
| 8,248,683 B2 * | 8/2012 | Lee et al. ................ 359/288 |
| 8,248,693 B2 | 8/2012 | Cook |
| 8,431,045 B2 | 4/2013 | Byker et al. |
| 8,623,243 B2 | 1/2014 | Anderson et al. |
| 2006/0159874 A1 | 7/2006 | Koran et al. |
| 2008/0092456 A1 | 4/2008 | Millett et al. |
| 2008/0100902 A1 | 5/2008 | Byker et al. |
| 2008/0100903 A1 | 5/2008 | Byker et al. |
| 2008/0105851 A1 | 5/2008 | Byker et al. |
| 2008/0106781 A1 | 5/2008 | Byker et al. |
| 2010/0270519 A1 * | 10/2010 | Blackman et al. ......... 252/586 |
| 2011/0075244 A1 * | 3/2011 | Millett et al. ............. 359/288 |
| 2012/0001134 A1 | 1/2012 | Byker et al. |
| 2013/0286461 A1 | 10/2013 | Broekhuis et al. |
| 2013/0310357 A1 | 11/2013 | Liu |

FOREIGN PATENT DOCUMENTS

| | | |
|---|---|---|
| JP | 2004-359623 | 12/2004 |
| WO | 2008/028099 | 3/2008 |
| WO | 2008/028128 | 3/2008 |

OTHER PUBLICATIONS

Kojima, K. et al., "Pressure and Temperature Effects on Octahedral-Tetrahedral Equilibria in Pyridine Solutions of Some Cobalt(II) Halides. II," *Bull. Chem. Soc. Jpn.*, vol. 57, No. 3, pp. 879-880 (Mar. 1984).

Yanush, O.V. et al., "Laminated Glass with Variable Transmission for Daylight Regulation," Glass Processing Days, Conference Proceedings, pp. 815-817, Seventh International Conference (Jun. 18-21, 2001).

Halopenen, I. et al., "Smart Laminated Glasses for Regulation of Lighting," Glass Processing Days, Conference Proceedings, pp. 324-326, Sixth International Conference (Jun. 13-16, 1999).

Srivastava, J. et al., "Synthesis of Polyacrylic Acid Based Thermochromic Polymers," *Proc. of SPIE*, vol. 5062, pp. 111-115 (2003).

(56) References Cited

OTHER PUBLICATIONS

Kojima, K. et al., "Pressure and Temperature Effects on Octahedral-Tetrahedral Equilibria in Pyridine Solutions of Some Cobalt(II) Halides," *Bull. Chem. Soc. Jpn.*, vol. 56, No. 3, pp. 684-688 (Mar. 1983).

Griffiths, T.R. et al., "Effects of Cations upon Absorption Spectra Part 4.-Octahedral-Tetrahedral Equilibria between Chloro-nickel(II) Complexes in Ethylene Glycol and Glycerol," *Trans. Faraday Soc.* 65, pp. 3179-3186 (1969).

Griffiths, T.R. et al., "Effects of Cations upon Absorption Spectra Part 2.-Formation of Tetrahedral Tetrachloronickelate(II) in Aqueous Solution," *Trans. Faraday Soc.*, 65, pp. 1727-1733 (1969).

Gill, Naida S. et al., "Complex Halides of the Transition Metals. Part I. Tetrahedral Nickel Complexes," *J. Chem. Soc.*, pp. 3397-4007 (1959).

Sunamoto, J. et al., "Solvochromism and Thermochromism of Cobalt(II) Complexes Solubilized in Reversed Micelles," *Bulletin of the Chemical Society of Japan*, vol. 51, No. 11, pp. 3130-3135 (Nov. 1978).

Marinkovic, M. et al., "Thermochromic complex compounds in phase change materials: Possible application in an agricultural greenhouse," *Solar Energy Materials and Solar Cells*, 51, pp. 401-411 (1998).

Arutjunjan, R.E. et al., "Thermochromic Glazing for 'Zero Net Energy' House," Glass Processing Days, Conference Proceedings, pp. 299-301, Eighth International Conference (Jun. 15-18, 2003).

Rozova, K.B. et al., Abstract for "Sun screening thermochromic glazing materials," TsNIIEP, USSR. Svetotekhnika (1986), (10), 12-14. CODEN: SVETAG ISSN: 0039-7067. Journal written in Russian. CAN 107:30324 AN 1987:430324 CAPLUS.

Greenberg, C., "Chromogenic Materials (Thermochromic)," *Kirk-Othmer Encyclopedia of Chemical Technology 4th Edition*, vol. 6, pp. 337-343, John Wiley & Sons (2000).

Sone, K. et al., *Inorganic Thermochromism*, pp. 1-71, Springer-Verlag (1987).

Angell, C.A., "Octahedral-Tetrahedral Coordination Equilibria of Nickel (II) and Copper (II) in Concentrated Aqueous Electrolyte Solutions," *Journal of the American Chemical Society*, 88 (22), pp. 5192-5198 (Nov. 20, 1966).

Day, J.H., "Thermochromism of Inorganic Compounds," *Chemical Reviews*, vol. 68, No. 6, pp. 649-657 (Nov. 25, 1968).

Scaife, D.E. et al., "Influence of Temperature on Some Octahedral-Tetrahedral Equilibria in Solution," *Inorganic Chemistry*, vol. 6, No. 2, pp. 358-365 (Feb. 1967).

Sunamoto, J. et al., "Formation of Polynuclear Cupric Halides in Cationic Reversed Micelles," *Inorganic Chemistry*, vol. 19, No. 12, pp. 3668-3673 (1980).

Sunamoto, J. et al., "Reversed Micelles to Mimic the Active Site of Metalloenzymes," *Inorganica Chimca Acta*, 92, pp. 159-163 (1984).

Katzin, L.I., "Energy Value of the Octahedral-Tetrahedral Coordination Change," *The Journal of Chemical Physics*, vol. 35, No. 2, pp. 467-472 (Aug. 1961).

Sestili, L. et al., "Formation Equilibria of Pseudotetrahedral Co(II) Halogenocomplexes in Acetonitrile," *J. Inorg. Nucl. Chem.*, No. 32, pp. 1997-2008 (1970).

*Kirk-Othmer Encyclopedia of Chemical Technology Third Edition*, vol. 6 "Chromogenic Materials (Electro-, Thermo) Electrochromic and Thermochromic," pp. 129-142, John Wiley & Sons (1979).

Long, G.J. et al., "Transition Metal Chemistry of Quinuclidinone-Containing Ligands. III. Electronic and Structural Properties of Several Transition Metal Complexes Containing trans-2-(2'-Quinolyl)methylene-3-quinuclidinone," *Inorganic Chemistry*, vol. 13, No. 2, pp. 270-278 (XP-002465696) (1974).

Kuroiwa, K. et al., "Heat-Set Gel-like Networks of Lipophilic Co(II) Triazole Complexes in Organic Media and Their Thermochromic Structural Transitions," *Journal of the American Chemical Society*, vol. 126, pp. 2016-2021 (XP-002465697) (2004).

Weber, Michael F. "Giant Birefringent Optics in Multilayer Polymer Mirrors", Science, vol. 287, pp. 2451-2456. (2000).

\* cited by examiner

ENHANCED THERMOCHROMIC WINDOW WHICH INCORPORATES A FILM WITH MULTIPLE LAYERS OF ALTERNATING REFRACTIVE INDEX

BACKGROUND

The present application discloses thermochromic windows containing a film with multiple layers of alternating refractive index.

Variable transmission windows are of interest for minimizing heat load in buildings when there is direct sunlight and for maximizing daylighting throughout the day even with widely varying sunlight conditions. There is a desire for variable transmission windows to tint with a neutral color. This may require more than one chromogenic layer to achieve the required spectral coverage. Multiple layers are often needed with sunlight responsive thermochromic layers for windows and the use of multiple thermochromic layers to achieve neutral appearance of transmitted light is described in detail in U.S. Pat. No. 7,525,717, the contents of which are hereby incorporated by reference. Whether to achieve neutral coloration or if multiple layers are desired for other reasons, the thermochromic layers used in windows generally must be separated from each other in order to keep the different materials in each layer from diffusing into the other layers. If the materials intermix they could change the performance and possibly the durability of each layer. The separator layer is generally a glass or plastic layer that is impermeable to the materials in the thermochromic layers.

Preferred plastic separator layers for use in thermochromic windows are made of polyolefins like various types of polyethylene and polypropylene, cellulosics like cellulose acetate butyrate and cellulose triacetate, polyester terephthalates like polyethylene terephthalate, acrylics or polycarbonates. Plastic separator layers are typically in the form of films or sheets that are 25 microns to 500 microns thick. Particularly useful glass separators are made of soda lime or borosilicate glass with a thickness of 50 to 6000 microns.

Particularly useful thermochromic materials for use in the thermochromic layers of the present application are termed ligand exchange thermochromic, LETC, materials. LETC materials have thermochromic activity which results in a reversible change in absorbance of electromagnetic radiation as the temperature of the system is reversibly changed. That the change is reversible means that the absorbance increase as the temperature increases is the same as the absorbance decrease as the temperature decreases for a cycle of temperature increase and decrease over a given temperature range. LETC materials of interest for use in practical thermochromic systems, layers and devices are stable on repeated temperature cycling for some useful number of cycles. Particularly useful LETC materials and systems have a net increase in their ability to absorb visible and/or NIR light energy as the temperature of the system increases and a net decrease in their ability to absorb visible and/or NIR light energy as the temperature of the system decreases for temperatures within the active range of the system. The active temperature range of the system is determined by the thermodynamic properties of the LETC reactions. For many particularly useful applications, like sunlight responsive thermochromic windows, the active temperature range includes −20° C. to 100° C.

It is preferred that the electromagnetic radiation, for which absorbance changes occur, be in the ultraviolet or especially the visible and/or NIR portions of the electromagnetic spectrum. The change in light absorption on heating of the LETC systems generally results in a change from one color to another color and/or a darkening of the color of the system. If the increase in light absorption is predominantly in the NIR, the LETC system may still be very useful even though little or no visual color change occurs. However, for most preferred applications of the LETC systems or layers utilized herein, there is a net increase in the ability of the system to absorb incident visible sunlight power (or energy over time), as the temperature of the system increases from T1 to T2 and an equal net decrease in the ability of the system to absorb incident visible sunlight power (or energy over time), as the temperature of the system decreases from T2 to T1. In most cases, this means that the LETC systems become darker in color as the temperature of the system increases and lighter in color as the temperature of the system decreases. In general, there is no change in the amount of light scattered or reflected by the LETC system itself.

U.S. Pat. Nos. 7,525,717; 7,538,931; 7,542,196 and 8,018,639, which describe LETC materials, systems, layers, devices and windows are hereby incorporated into this disclosure by reference. LETC systems comprise one or more than one transition metal ion, such as Fe(II), Co(II), Ni(II) or Cu(II) ions, which experiences thermally induced changes in the nature of the complexation or coordination around the transition metal ion(s) and thereby the system changes its ability to absorb electromagnetic radiation as the temperature changes. As explained in U.S. Pat. Nos. 7,525,717; 7,538,931; 7,542,196 and 8,018,639, LETC systems employ so-called high epsilon ligands, (HϵL's), and low epsilon ligands, (LϵL's). Upon increasing the temperature of the thermochromic system, layer or device, one or more of the LϵL's will be displaced by one or more HϵL's to give a complex that absorbs more visible and/or NIR radiation. Examples of LϵL's are diols, triols and certain hydroxy containing polymers like poly(vinyl butyral). Examples of HϵL's are chloride, bromide, iodide and molecules that coordinate to transition metal ions through one or more than one nitrogen, oxygen, phosphorus or sulfur atom in the HϵL molecule.

For the use of LETC systems in applications like variable transmission, energy saving windows, especially Sunlight Responsive Thermochromic, SRT™, windows, there is a demand for certain colors. While fixed tint windows which are gray, green, blue and bronze are in widespread use, the most desirable color, (or lack thereof), for variable tint windows is gray. This is especially true when the window is or is able to become heavily tinted as the view through a heavily tinted gray window maintains the same color rendition for objects viewed through the window as is maintained with a lightly tinted or nearly colorless window. Also it is highly desirable for the daylighting that comes in through the window to be color neutral so that people and objects illuminated by the incoming light have an acceptable appearance.

The systems disclosed here-in are particularly useful when used in combination with the window structures or constructions disclosed in U.S. Pat. Nos. 6,084,702; 6,446,402 and 7,817,328. The contents of these patents are hereby incorporated into this disclosure by reference.

SUMMARY OF THE INVENTION

Most previous separators for separating thermochromic layers from each other were generally transparent to visible and near infrared, (NIR), light thus these separators did not contribute to the solar control of the layers when they were used in a thermochromic window. It has been discovered that films with reflection properties in the NIR can be used as separators for thermochromic films. A particularly useful separator film of this type is made up of multiple polymer layers where alternating layers of two or more polymer materials have different indices of refraction. Herein these films are referred to as multiple layers of alternating refractive index, (MLARI), films. If the thickness of the layers and the indices of refraction are properly chosen, these films can reflect portions of the solar spectrum and thereby enhance the performance of a window that incorporates such a film. The reflections of the MLARI film in the NIR is particularly synergistic with the predominately visible light absorbance changes of many thermochromic systems since the combination covers more of the solar spectrum that causes undesirable heat load on buildings. In the present application, it is preferred that the reflectance of MLARI films reflect light or radiation in the NIR region. However, these films may also reflect portions of the UV and/or visible and may have some absorbance in the UV, visible and/or NIR portions of the spectrum and still be effective in enhancing the performance of windows into which these films are incorporated.

MLARI films reflect light or electromagnetic radiation based on the well known principle of dielectric mirrors. As electromagnetic radiation passes from a medium of one index of refraction to another medium with a different index of refraction an amount of the electromagnetic radiation is reflected based on the magnitude of the difference in the indices of refraction between the two media. If the media are in thin alternating layers the reflections of the electromagnetic radiation can constructively or destructively interfere. This interference is dependent on the wavelengths of electromagnetic radiation, the difference in index of refraction between the media and thicknesses of the layers. The media generally have little or no absorption of the electromagnetic radiation involved. The layers may be made up of metal oxides, polymers or combinations thereof.

DETAILED DESCRIPTION

The layers making up the MLARI film have different refractive index characteristics so that some light is reflected at interfaces between adjacent layers. The layers are sufficiently thin so that light reflected at a plurality of the interfaces undergoes constructive or destructive interference in order to give the film the desired reflective or transmissive properties. For MLARI films designed to reflect light at ultraviolet, visible, or near-infrared wavelengths, each layer generally has an optical thickness (i.e., a physical thickness multiplied by refractive index) of less than about 1 micrometer. Thicker layers can, however, also be included, such as skin layers at the outer surfaces of the film, or protective boundary layers disposed within the film that separate packets of layers.

In accordance with one embodiment of the invention, the MLARI layer is used to separate two or more thermochromic layers. In accordance with another embodiment, the MLARI layer is used in conjunction with one or more thermochromic layers but not as a separator. In this embodiment, a conventional separator may be used to support or separate the thermochromic layers and the MLARI layer may be suspended in a gas space or carried on a separate glass or plastic substrate or pane within the window as illustrated in FIG. 2D or 2E. In still another embodiment as illustrated in FIG. 2F the MLARI film may be used as a separator and it may also be included on a separate glass or plastic substrate within the window. In the latter two embodiments, the MLARI film may be positioned in the window such that it reflects incoming light or radiation. In the embodiment shown in FIG. 2D, the MLARI film reflects the incoming light or radiation into the thermochromic layers so as to enhance the thermochromic layer performance or increase the level of tinting by heating it.

The reflective and transmissive properties of the multilayer film are a function of the refractive indices of the respective layers (i.e., microlayers). In practice, the refractive indices are controlled by judicious materials selection and processing conditions. The multilayer film can be made by co-extrusion of typically tens or hundreds of layers of two alternating polymers A, B, followed by optionally passing the multilayer extrudate through one or more multiplication dies, and then stretching or otherwise orienting the extrudate to form a final film. The resulting film is composed of typically tens or hundreds of individual layers whose thicknesses and refractive indices are tailored to provide one or more reflection bands in desired region(s) of the spectrum, such as in the visible, near infrared, and/or infrared.

The multilayer film can be formed by any useful combination of alternating polymer type layers. In many embodiments, at least one of the alternating polymer layers is birefringent and oriented. In some embodiments, one of the alternating polymer layers is birefringent and oriented and the other alternating polymer layer is isotropic. In one embodiment, the multilayer optical film is formed by alternating layers of a first polymer type including polyethylene terephthalate (PET) or copolymer of polyethylene terephthalate (coPET) and a second polymer type including poly(methyl methacrylate) (PMMA) or a copolymer of poly(methyl methacrylate) (coPMMA). In another embodiment, the multilayer optical film is formed by alternating layers of a first polymer type including polyethylene terephthalate and a second polymer type including a copolymer of poly(methyl methacrylate and ethyl acrylate).

In another embodiment, the multilayer film is formed by alternating layers of a first polymer type including cyclohexanedimethanol modified polyester terephthalate (PETG) or a copolymer of cyclohexanedimethanol modified polyester terephthalate (coPETG) and second polymer type including polyethylene naphthalate (PEN) or a copolymer of polyethylene naphthalate (coPEN). In another embodiment, the multilayer optical film is formed by alternating layers of a first polymer type including polyethylene naphthalate or a copolymer of polyethylene naphthalate and a second polymer type including poly(methyl methacrylate) or a copolymer of poly (methyl methacrylate). Useful combinations of alternating polymer type layers are disclosed in U.S. Pat. No. 6,352,761, which is incorporated by reference herein.

For the present application, alternating layers of the following polymers are particularly useful. MLARI films may be provided by alternating layers of for example:

1) polymethylmethacrylate and polycarbonate
2) polymethylmethacrylate and a birefringent polyester like polyethylene naphthalate or polyethylene terephthalate
3) polyethylene and polystyrene Many other combinations of these and other polymers may be used. The polymer films may have isotropic indices of refraction or one or both films may be birefringent, (i.e., having anisotropic indices of refraction). The advantages of birefringent polymer layers to reduce the angle dependence of the intensity of the reflection of electromagnetic radiation is described in detail in Science 287, pages 2451-2456, (2000). Layer thicknesses are typically in the 75 to 150 nanometer range. The total number of layers is typically between about 100 and 1000. The difference between indices of refraction is typically about 0.05 to 0.2 for the two media or polymers making up the MLARI.

Multiple, thin film polymer layers with alternating refractive index which provide selective reflection properties have been known for a number of years and numerous patents describe this technology. Several of the U.S. patents related to this technology: U.S. Pat. Nos. 3,610,724; 3,759,647; 3,773,882; 3,884,606; 4,162,343; 4,310,584; 4,446,305; 4,540,623; 5,103,337; 5,126,880; 5,269,995; 5,278,694; 5,360,659; 5,389,324; 5,448,404; 5,540,978; 5,552,927; 5,882,774; 5,976,424; 6,045,894; 6,088,163; 6,368,699; 6,459,514; 6,531,230; 6,565,982; 6,788,463; 6,827,886; 6,830,713; 6,924,014; 6,999,233; 7,057,816; 7,138,173; 7,147,903; 7,255,914; 7,297,393 and 7,851,054 are hereby incorporated by reference.

Also, U.S. Pat. No. 7,952,805 and the article "Science 287, 2451-2456, (2000)" give good technical descriptions of MLARI films and are hereby incorporated by reference.

Figure 1:
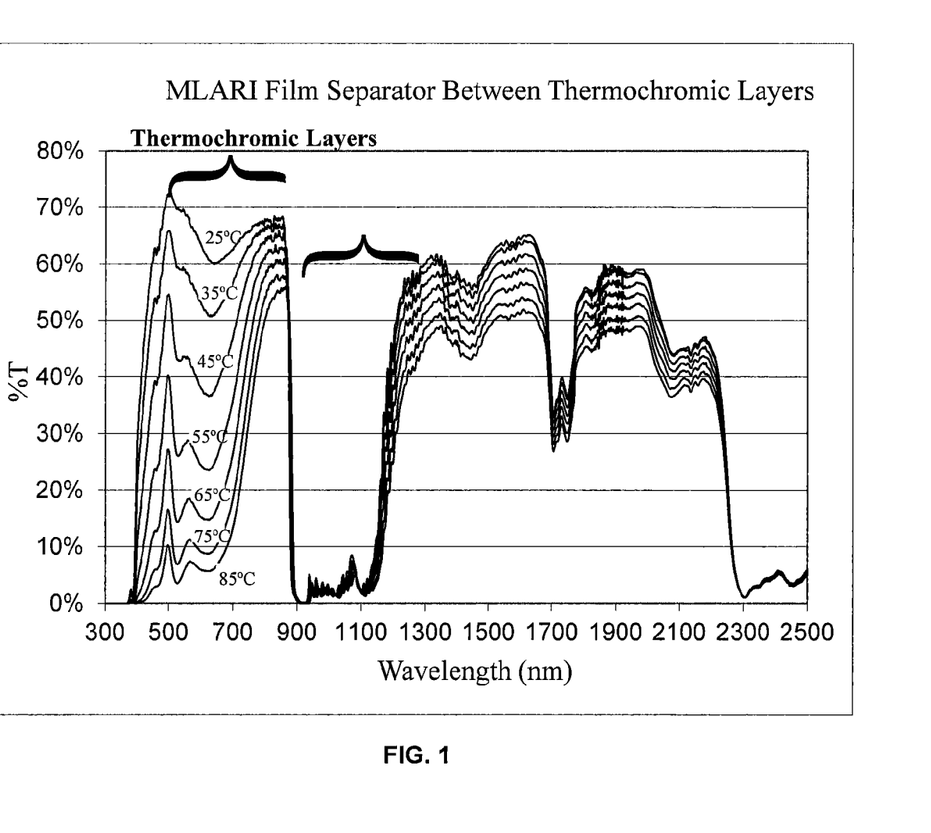
FIG. 1 shows the transmission versus wavelength at various temperatures for a laminate of two thermochromic layers, with a MLARI film separator laminated between two sheets of clear soda-lime float glass.

If the reflectance provided by the MLARI film is in the NIR, the film can help reflect sunlight energy to the outside of a building while still allowing in desirable daylighting. This is particularly advantageous when the film is used as a separator to separate thermochromic layers that predominantly change transmission in the visible portion of the solar spectrum. FIG. 1 shows the transmission spectra of a window device in accordance with one aspect of the present disclosure. The thermochromic layers change the visible transmission of the window by changing the amount of visible light absorbed as the temperature changes. The MLARI separator between the thermochromic layers causes the transmission to be at low, nearly constant levels at certain wavelengths in the NIR based on the reflection of light or radiation of these wavelengths.

Preferred MLARI separators are "Sun Control Window Films" which are commercially available from 3M of St. Paul, Minn. Examples of particularly useful separators include "Sun Control Window Films" selected from 3M's Prestige Series, Ceramic Series, Night Vision Series or Traditional Series. Sometime these preferred films are referred to as Ultra Clear Solar Film, (UCSF) from 3M.

Certain aspects of the present application are described in more detail in the following non-limiting examples:

EXAMPLES

Example 1

A 3 layer stack of: 1) a first thermochromic layer, 2) a MLARI separator, and 3) a second thermochromic layer was placed between 2 sheets of soda-lime float glass and heated under vacuum in vacuum bag lamination apparatus until a uniform laminate was formed. The first thermochromic, poly (vinyl butyral) based layer was light tan at room temperature and turned progressively darker orange on heating to 85° C. The MLARI separator was a UCSF obtained from 3M. The second thermochromic, poly(vinyl butyral) based layer was light blue-green at room temperature and turned progressively darker blue on heating to 85° C. Together the orange and the blue tinting layers provide a relatively neutral appearance for light transmitted through the combination of layers. FIG. 1 shows the transmission versus wavelength at various temperatures for a laminate of two thermochromic layers, with a MLARI film separator between two sheets of soda lime glass. The thermochromic layers cause changes of the visible light transmission as the temperature changes and the MLARI film gives a nearly constant, very low transmission from about 900 nm to about 1200 nm by reflecting light of these wavelengths.

Table 1 below shows the durability testing for the laminate of Example 1.

TABLE 1

| | 25C. | | |
|---|---|---|---|
| | 25C. | | |
| WOM hours | a* | b* | Y |
| 0 | −9.7 | 10.3 | 74.8 |
| 656 | −8.1 | 5.1 | 74.6 |
| 1135 | −8.4 | 5.7 | 72.7 |
| 1553 | −8.3 | 6.1 | 74.0 |
| 2113 | −8.3 | 6.0 | 73.3 |
| 3065 | −8.4 | 6.4 | 72.6 |
| 4033 | −8.4 | 6.2 | 71.8 |
| 6000 | −8.6 | 6.9 | 70.3 |
| 8056 | −8.2 | 8.0 | 71.1 |
| | 85C. | | |
| WOM hours | a* | b* | Y |
| 0 | −1.8 | 14.3 | 6.5 |
| 656 | −4.0 | 13.0 | 6.7 |
| 1135 | −4.2 | 12.8 | 6.6 |
| 1553 | −4.2 | 12.7 | 6.5 |
| 2113 | −4.1 | 12.1 | 6.6 |
| 3065 | −5.2 | 11.9 | 7.2 |
| 4033 | −5.4 | 11.6 | 7.4 |
| 6000 | −6.5 | 10.3 | 7.9 |
| 8056 | −5.6 | 11.8 | 7.1 |

Example 2

The laminate of Example 1 was placed in an Atlas Electric Weather-ometer and was exposed to light from a xenon arc lamp at 0.55 W/m2 at 340 nanometer with black panel temperature of 85 C. The spectra of the laminate at 25° C. and at 85° C. were measured before exposure and again at each time after the hours of exposure in the Weather-ometer listed in Table 1. From the spectra the color coordinates a* and b* and the CIE white light transmission for D65 designated as Y were calculated. These results are shown in Table 1. The results show that the MLARI layer is acting as an excellent separator for the thermochromic layers by being largely impermeable to the components of the thermochromic layer. Overall the device with this novel separator is showing excellent durability based on the measured data and visual inspection.

The structures disclosed herein can also be utilized with other mechanisms to improve system stability or durability. For example, the teachings herein can be combined with those in U.S. patent application Ser. No. 13/310,357, filed Dec. 2, 2011 entitled "ANTI-YELLOWING FOR THERMOCHROMIC SYSTEMS" which discloses thermochromic systems containing an anti-yellowing agent in an amount sufficient to minimize or eliminate the yellow color formation that is associated with some thermochromic systems. Thermochromic systems susceptible to yellowing are stabilized by inclusion of the anti-yellowing material in the composition. The contents of the '357 application are hereby incorporated by reference.

While it is particularly useful in the present application to use the MLARI films as a separator for the thermochromic layers, at times it is also desirable to use MLARI films in other structures or configurations of thermochromic windows. Several of these structures are shown in FIGS. 2A-2F. In these window structures the MLARI films tend to improve the performance of the thermochromic layer(s), since the thermochromic layers often absorb at least a portion of the light or radiation reflected by the MLARI films. A portion of the sunlight of these wavelengths is absorbed on the first pass through one or more of the thermochromic layers and then some of the light of these wavelengths is reflected by the MLARI layer back through the thermochromic layer(s) and more is absorbed. Thereby the thermochromic layers tend to become warmer and darken more than they would in the absence of such reflections. Additional darkening of the thermochromic layers is desirable under many circumstances.

Figure 2A:
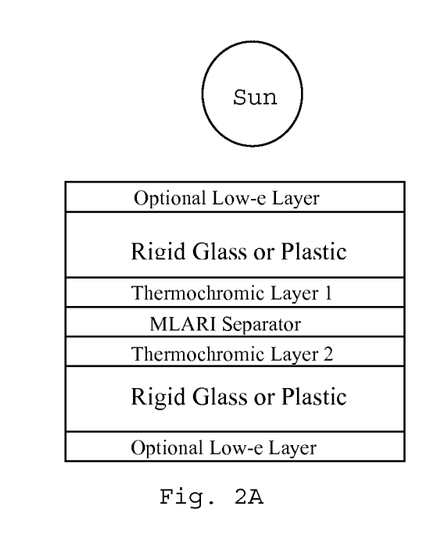
FIG. 2A shows a monolithic window pane with multiple thermochromic layers, a MLARI separator and optional low-e layers which are preferably hard coat low-e layers.
Figure 2B:
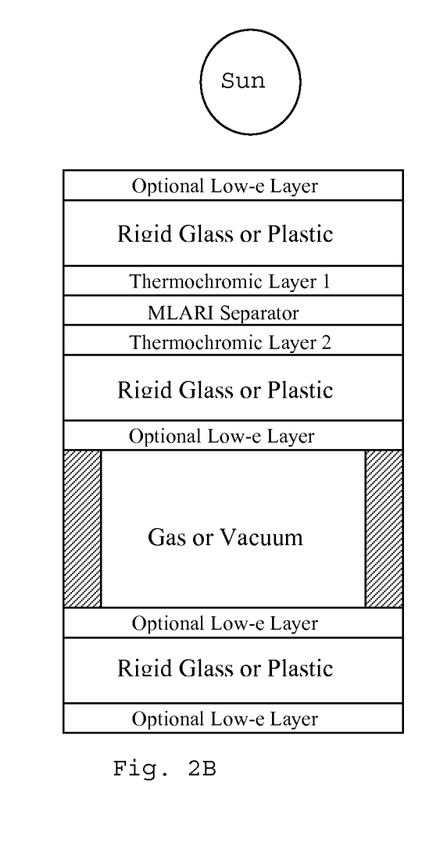
FIG. 2B shows an enhanced performance thermochromic, double pane insulated glass window unit with two thermochromic layers, a MLARI separator and optional low-e layers.
Figure 2C:
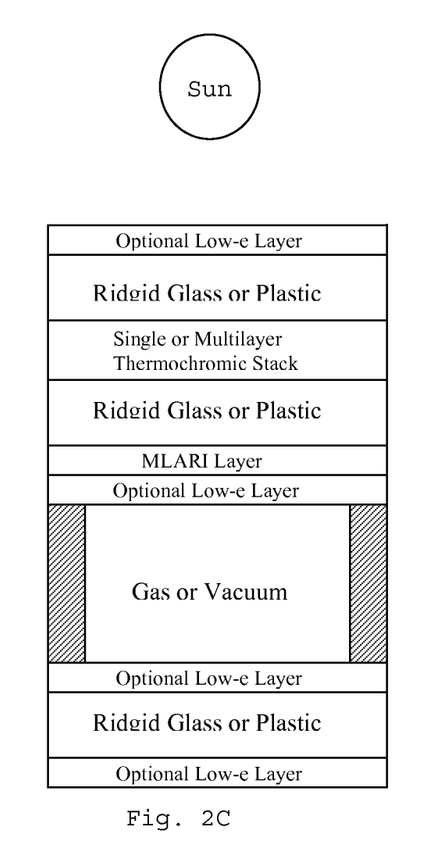
FIG. 2C shows an enhanced performance thermochromic, double pane insulated glass window unit with a MLARI film on the interior surface of a thermochromic laminate and optional low-e layers.
Figure 2D:
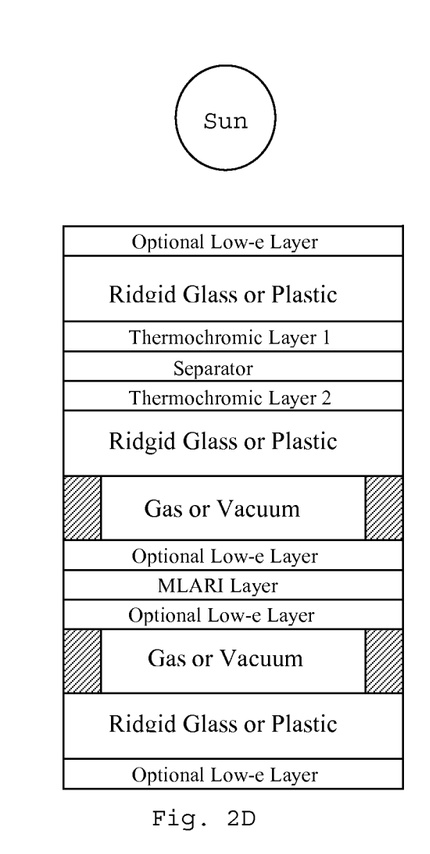
FIG. 2D shows an enhanced performance thermochromic, triple pane insulated glass window unit with a MLARI suspended film in the gas space of the unit and optional low-e layers.
Figure 2E:
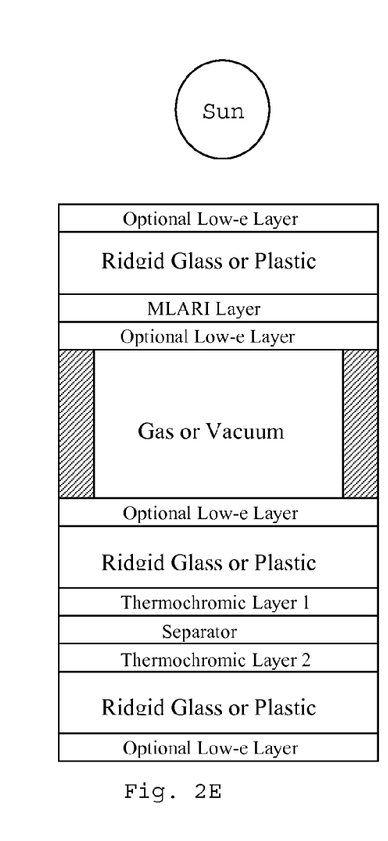
FIG. 2E shows an enhanced performance thermochromic, double pane insulated glass window unit with a MLARI layer on the interior of the exterior pane, a thermochromic laminate and optional low-e layers. This structure is preferred in certain sloped glazing and skylight applications.
Figure 2F:
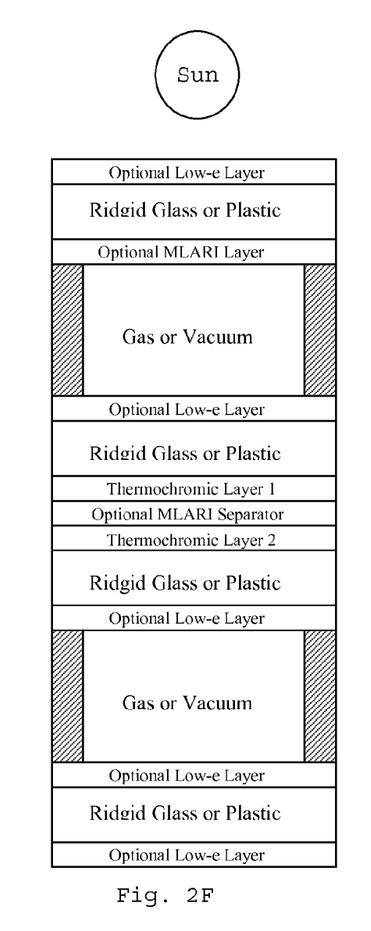
FIG. 2F shows an enhanced performance thermochromic, triple pane insulated glass window unit with one or two MLARI layers, a thermochromic laminate as the center pane and optional low-e layers. This structure is preferred in certain cold climates and windy environments.
Figure 3:
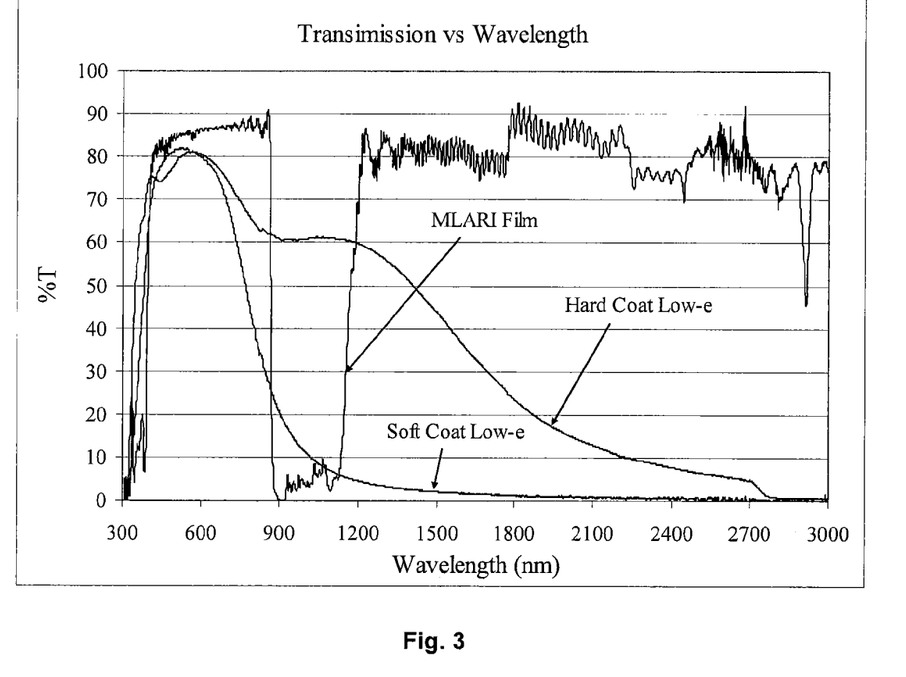
FIG. 3 shows the transmission versus wavelength for: PPG Solarban® 60, soft coat low-e coating on clear glass; PPG Sungate® 500 hard coat low-e coated on clear glass and a MLARI film from 3M® in air.

A particularly advantageous structure is shown in FIG. 2A. This may be referred to as a monolithic window structure. Monolithic window structures are used in many warm climate locations throughout the world. Many of these locations also experience heat load problems from excess sunlight penetrating through windows. When double pane or insulated glass units are used it is easy to provide good NIR reflection with a soft coat or silver metal based low-e coating. Transmission as a function of wavelength for a typical silver based low-e coating is shown in FIG. 3. However these soft coat or silver metal based low-e coating are not durable when exposed to the elements and thus are not used on the exterior surfaces of windows including monolithic windows. Hard coat low-e coatings are normally sufficiently durable to be exposed to the elements. Hard coat low-e coatings are often composed of fluorine doped tin oxide, fluorine doped zinc oxide, tin doped indium oxide or aluminum doped zinc oxide prepared by physical, chemical vapor or powder deposition processes. Generally, these coating are sufficiently durable to be exposed to the elements especially when compared to soft coat low-e coatings.

Hard coat low-e coating may be used on the exterior or exposed surfaces of window substrates like glass. The transmission as a function of wavelength for a typical hard coat low-e coating is also shown in FIG. 3. Here the NIR rejection at the wavelengths of interest is much less and the reflection provided by a MLARI film has significant advantage in making a monolithic window more energy efficient. FIG. 3 shows the transmission of a typical MLARI film as a function of wavelength and thereby shows the advantage the MLARI film can provide when it is necessary or desirable to use a hard coat low-e coating as opposed to a soft coat low-e coating.

It has been discovered that it is important for polymeric separators like MLARI films to adhere well to the thermochromic layers so that there is no delamination between the films prior to or during the lamination of the stack of thermochromic and separator films between sheets of glass. If the natural adhesion between the separator and thermochromic layer(s) is insufficient, one or more surfaces of the separator may be treated in some manner to promote adhesion. Separators, including MLARI films, may be treated in by one or more of the following processes. The separator may be coated with one or more metal oxides such as oxides of silicon titanium, zinc, tin and indium and mixtures thereof. The separator surfaces may be pretreated, activated or excited by processes such as exposure to ozone, atmospheric plasma treatment with various gases and gas mixtures or by glow discharge, plasma or corona treatment processes in vacuum, partial vacuum, inert atmosphere, oxygen or air. The separator may be coated with adhesion promoting coating of coupling agents, such as silane coupling agents or primers including organic primers such as amines, imine, urethanes, ureas, polyvinylchloride, polyvinylidene chloride, polyallylamines or water based primers.

The present application discloses a multilayer plastic laminate comprising two or more than two thermochromic layers and one or more than one separator layer wherein at least one of the separator layers is a MLARI film.

Another manifestation of this disclosure relates to a multilayer plastic laminate comprising two or more than two thermochromic layers and one or more than one separator layer wherein at least one of the separator layers is a MLARI film and wherein the multilayer plastic laminate is laminated between rigid substrates of glass or plastic.

In accordance with another aspect, this present application provides a multilayer plastic laminate comprising two or more than two thermochromic layers and one or more than one separator layer wherein at least one of the separator layers is a MLARI film and wherein the multilayer plastic laminate is laminated between rigid substrates of glass or plastic and wherein one or more than one of the substrates has a hard coat low-e coating on an exterior surface.

In yet another manifestation, the present application provides is a multilayer plastic laminate comprising two or more than two thermochromic layers and one or more than one separator layer wherein at least one of the separator layers is a MLARI film and wherein the multilayer plastic laminate is laminated between rigid substrates of glass or plastic and wherein one or more than one of the substrates has a hard coat low-e coating on an exterior surface and the laminate is used as monolithic window installed in a building.

In accordance with another aspect, the present application provides a multilayer plastic laminate comprising two or more than two thermochromic layers and one or more than one separator layer wherein at least one of the separator layers is a MLARI film and wherein the multilayer plastic laminate is laminated between rigid substrates of glass or plastic and wherein one or more than one of the substrates has a hard coat and/or a soft coat low-e coating on an exterior surface and the laminate is used as the interior pane or the exterior pane of a double pane insulated glass unit.

In accordance with yet another aspect, the present application provides a thermochromic laminate comprising at least one thermochromic layer between glass or plastic substrates wherein the laminate further comprises a MLARI film on one of the substrates.

In accordance with another aspect, the present application provides a thermochromic laminate comprising at least one thermochromic layer between glass or plastic substrates wherein the laminate further comprises a MLARI film on one of the substrates wherein the laminate is used as a monolithic window pane or as the interior or the exterior pane of a double pane insulated glass unit.

In accordance with another aspect, the present application provides a thermochromic laminate comprising at least one thermochromic layer between glass or plastic substrates wherein the laminate is the interior or the exterior pane of a double pane insulated glass unit and the insulated glass unit comprises a suspended MLARI film which is effective to divide the gas space into two compartments.

Any of the foregoing aspects of the present application may include one or more than one hard coat and/or soft coat low-e layer on any gas or vacuum exposed surface of any substrate or any gas or vacuum exposed surface of a MLARI film.

The present application also provides a system, series of layers, device or window in which a MLARI film is a separator for thermochromic layers.

In accordance with another aspect, the present application provides a window comprising a thermochromic layer and a film comprised of multiple layers of polymer with alternating refractive index wherein the thermochromic layer has a reversible change in absorbance of electromagnetic radiation such that the absorbance increases as the temperature of the thermochromic layer increases and the absorbance decreases at the temperature of the thermochromic layer decreases.

In accordance with another aspect, the present application provides a window comprising more than one thermochromic layer wherein two of the thermochromic layers are adhered to and separated by a film comprised of multiple layers of polymer with alternating refractive index wherein the thermochromic layers each have a reversible change in absorbance of electromagnetic radiation such that the absorbance increases as the temperature of the thermochromic layer increases and the absorbance decreases at the temperature of the thermochromic layer decreases.

In accordance with another aspect, the present application provides a window that is single pane or monolithic window which comprises:
a) a thermochromic layer;
b) a film comprised of multiple layers of polymer with alternating refractive index;
c) a pair of rigid substrates;
d) a hard coat low-e coating on at least one of the substrates;
wherein the thermochromic layer has a reversible change in absorbance of electromagnetic radiation such that the absorbance increases as the temperature of the thermochromic layer increases and the absorbance decreases at the temperature of the thermochromic layer decreases and wherein a thermochromic layer and a film comprised of multiple layers of polymer with alternating refractive index are laminated between the rigid substrates.

In accordance with another aspect, the present application provides a window with a film comprised of multiple layers of polymer with alternating refractive index which has alternating layers of two of the following polymers: cyclohexanedimethanol, a copolymer of cyclohexanedimethanol, polymethylmethacrylate polycarbonate, polyethylene naphthalate, polyethylene terephthalate, polyethylene and polystyrene.

Having described the invention in detail and by reference to preferred embodiments thereof, it will be apparent that modifications and variations are possible without departing from the scope of the invention as defined by the following claims.

What is claimed is:

1. A window comprising more than one thermochromic layer wherein two of the thermochromic layers are separated by a film comprising multiple layers of polymer with alternating refractive index (MLARI) wherein the thermochromic layers each have a reversible change in absorbance of electromagnetic radiation such that the absorbance increases as the temperature of the thermochromic layer increases and the absorbance decreases as the temperature of the thermochromic layer decreases, and wherein the MLARI film reflects near infrared radiation.

2. The window of claim 1 wherein each thermochromic layer contains a ligand exchange thermochromic system.

3. The window of claim 1 wherein at least one of the thermochromic layers is adhered to the MLARI film.

4. The window of claim 3 wherein the MLARI film is treated to promote adhesion.

5. The window of claim 3 wherein the thermochromic layers and the MLARI film are laminated between rigid substrates of glass or plastic.

6. A window comprising more than one thermochromic layer wherein two of the thermochromic layers are adhered to and separated by a film comprised of multiple layers of polymer with alternating refractive index (MLARI) wherein the thermochromic layers each have a reversible change in absorbance of electromagnetic radiation such that the absorbance increases as the temperature of the thermochromic layer increases and the absorbance decreases as the temperature of the thermochromic layer decreases, and wherein the MLARI film reflects near infrared radiation.

7. The window of claim 6 wherein the thermochromic layer contains a ligand exchange thermochromic system.

8. The window of claim 6 wherein the MLARI film is treated to promote adhesion.

9. The window of claim 6 wherein the thermochromic layer and the MLARI film are laminated between rigid substrates of glass or plastic.

10. A window which comprises:
a) first and second thermochromic layers;
b) a film comprised of multiple layers of polymer with alternating refractive index (MLARI), wherein the MLARI film reflects near infrared radiation;
c) a pair of rigid substrates;
d) a hard coat low-e coating on at least one of the substrates;
wherein the first and second thermochromic layers each have a reversible change in absorbance of electromagnetic radiation such that the absorbance increases as the temperature of the thermochromic layer increases and the absorbance decreases as the temperature of the thermochromic layer decreases, wherein the MLARI film is positioned between the first and the second thermochromic layers, and wherein the thermochromic layers and the MLARI film are laminated between the rigid substrates;
wherein the window is a single pane or monolithic window.

11. The window of claim 10 wherein each thermochromic layer contains a ligand exchange thermochromic system.

12. The window of claim 10 wherein at least one of the first and second thermochromic layers is adhered to the MLARI film.

13. The window of claim 12 wherein the MLARI film is treated to promote adhesion.

14. The window of claim 10 wherein the hard coat low-e coating is on the exterior of one of the substrates.

15. The window of claim 1 wherein the window has a face facing the sun and comprises in order as defined from the face of the window facing the sun: a glass or plastic substrate, a first thermochromic layer, a MLARI film, a second thermochromic layer, and a second glass or plastic substrate.

16. The window of claim 1 wherein the window is a double pane window and has a face facing the sun and the pane on the face of the window facing the sun comprises in order as defined from the face of the window facing the sun: a glass or plastic substrate, a first thermochromic layer, a MLARI film, a second thermochromic layer, and a second glass or plastic substrate.

17. The window of claim 1 wherein the MLARI film comprises alternating layers of two of the following polymers: a cyclohexanedimethanol modified polyester terephthalate, a copolymer of cyclohexanedimethanol modified polyester terephthalate, polymethylmethacrylate, polycarbonate, polyethylene naphthalate, polyethylene terephthalate, polyethylene and polystyrene.

18. The window of claim 17 wherein the MLARI film comprises alternating layers of polymethylmethacrylate and polycarbonate.

19. The window of claim 17 wherein the MLARI film comprises alternating layers of polymethylmethacrylate and a birefringent polyester.

20. The window of claim 17 wherein the MLARI film comprises alternating layers of polymethylmethacrylate and a birefringent polyethylene naphthalate or polyethylene terephthalate.

21. The window of claim 17 wherein the MLARI film comprises alternating layers of polyethylene and polystyrene.

22. The window of claim 3 wherein both of the thermochromic layers separated by MLARI film are adhered to the MLARI film.

\* \* \* \* \*